United States Patent
Thies et al.

(10) Patent No.: US 10,620,056 B2
(45) Date of Patent: Apr. 14, 2020

(54) PROCESS VARIABLE MEASUREMENT SYSTEM WITH SECONDARY SEAL

(71) Applicant: Rosemount Inc., Shakopee, MN (US)

(72) Inventors: Ralf Thies, Gründau (DE); Richard Llagas, Pasay (PH); Ulrich Thiel, Moembris (DE); Dirk W Bauschke, Shakopee, MN (US)

(73) Assignee: Rosemount Inc., Shakopee, MN (US)

( * ) Notice: Subject to any disclaimer, the term of this patent is extended or adjusted under 35 U.S.C. 154(b) by 235 days.

(21) Appl. No.: 14/934,998

(22) Filed: Nov. 6, 2015

(65) Prior Publication Data
US 2017/0131150 A1    May 11, 2017

(51) Int. Cl.
| | |
|---|---|
| G01K 7/00 | (2006.01) |
| G01K 1/08 | (2006.01) |
| G01F 1/00 | (2006.01) |
| G01L 1/00 | (2006.01) |
| G01L 19/00 | (2006.01) |
| G01K 7/16 | (2006.01) |

(52) U.S. Cl.
CPC ............ *G01K 1/08* (2013.01); *G01F 1/00* (2013.01); *G01K 7/16* (2013.01); *G01L 1/00* (2013.01); *G01L 19/003* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,603,608 A * | 2/1997 | Marz | ............... | F04C 2/1071 |
| | | | | 277/320 |
| 6,059,453 A * | 5/2000 | Kempf | ............... | G01K 1/08 |
| | | | | 374/139 |
| 6,082,737 A * | 7/2000 | Williamson | ....... | G01M 13/005 |
| | | | | 277/317 |
| 6,575,377 B1 * | 6/2003 | Graves | ............... | G05D 23/136 |
| | | | | 236/12.2 |
| 6,578,429 B1 * | 6/2003 | Danna | ............... | G01D 5/04 |
| | | | | 73/732 |

(Continued)

FOREIGN PATENT DOCUMENTS

| | | |
|---|---|---|
| JP | S576035 U | 1/1982 |
| JP | S58138044 U | 9/1983 |

(Continued)

OTHER PUBLICATIONS

International Search Report and Written Opinion of PCT/US2016/059983, dated Feb. 13, 2017, 13 pages.
First Office Action for Chinese Application No. 201620340918.5 dated Aug. 4, 2016, 2 pages.
First Office Action for Chinese Patent Application No. 201610250814.X, dated Jul. 31, 2018, 12 pages including English translation.

(Continued)

*Primary Examiner* — Lisa M Caputo
*Assistant Examiner* — Nasir U. Ahmed
(74) *Attorney, Agent, or Firm* — Christopher R. Christenson; Kelly, Holt & Christenson PLLC

(57) ABSTRACT

An apparatus for sensing a process variable, includes a housing and a process variable sensor that has an electrical characteristic that changes with a process variable. A first sealed portion is configured to be exposed to a process fluid. The process variable sensor is mounted relative to the first sealed portion. A second sealed portion couples the first sealed portion to the housing. The second sealed portion has at least one seal that fluidically isolates the first sealed portion from the housing.

17 Claims, 10 Drawing Sheets

(56) References Cited

U.S. PATENT DOCUMENTS

| | | | |
|---|---|---|---|
| 7,165,883 B2 * | 1/2007 | Nimberger | C08L 79/08 374/148 |
| 7,465,086 B1 * | 12/2008 | Foreman, Jr. | G01K 1/08 136/200 |
| 8,109,670 B2 | 2/2012 | Al-Misfer | |
| 2005/0126261 A1 | 6/2005 | Matsuda et al. | |
| 2005/0223781 A1 | 10/2005 | Renk | |
| 2006/0070735 A1 * | 4/2006 | Guerra | E21B 43/34 166/267 |
| 2011/0222583 A1 * | 9/2011 | Boghun | B23K 26/22 374/208 |
| 2011/0311726 A1 * | 12/2011 | Liu | C23C 16/4481 427/255.26 |
| 2013/0083824 A1 * | 4/2013 | Bronczyk | G01K 1/02 374/163 |
| 2013/0233058 A1 | 9/2013 | Breen | |
| 2014/0269829 A1 | 9/2014 | Bronczyk | |

FOREIGN PATENT DOCUMENTS

| | | |
|---|---|---|
| JP | H0244662 A | 2/1990 |
| JP | H04505662 A | 10/1992 |
| WO | WO 2008048526 A2 | 4/2008 |

OTHER PUBLICATIONS

First Japanese Office Action dated Mar. 26, 2019, for Japanese Patent Application No. 2018-543014, 10 pages including English translation.

Extended Search Report dated May 28, 2019 for European Patent Application No. 16862818.8. 9 pages.

Second Chinese Office Action dated Apr. 1, 2019 for Chinese Patent Application No. 201610250814.X, 12 pages including English translation.

\* cited by examiner

PROCESS VARIABLE MEASUREMENT SYSTEM WITH SECONDARY SEAL

BACKGROUND

Industrial process control systems are used to monitor and control industrial processes that produce or transfer fluids or the like. In such systems, it is typically important to measure "process variables" such as temperatures, pressures, flow rates, level, etc. Process control sensors and transmitters measure and transmit process variables and information related to the measured process variable back to a central location such as a central control room. Additionally, some process variable transmitters may transmit information to other process devices as well.

Examples of process variable measurement include process fluid pressure measurement, process fluid flow measurement, process fluid temperature measurement, process fluid level measurement, etc. The sensors of such devices are typically exposed to a process fluid (liquid or gas) such that a relevant parameter can be measured and transmitted to a monitoring and/or control system in order to effect process control. While providing accurate and precise measurements of the process variables is important for effective for process control, a more basic requirement is that the process fluid itself must not escape. Thus, the process variable measurement point should not generate any leaks in the process installation. Moreover, it is also important that maintenance personnel, tasked to maintain such process devices, not be exposed to hazards as they perform their maintenance activities.

In many industrial process measurement applications, seals are required in order to prevent process fluid leaks. A seal, or pressure barrier, is a mechanical structure that contains process fluid in order to ensure the safety of plant personnel. As such, primary seals or pressure barriers are very important for a process fluid measurement system. In order to provide a safe and robust system, some applications require redundant seals or pressure barriers in order to ensure the safety of plant personnel in the event of failure of a primary seal. Thus, if the primary seal (such as a thermowell) fails, the process fluid will still be contained by a secondary seal or pressure barrier.

SUMMARY

An apparatus for sensing a process variable, includes a housing and a process variable sensor that has an electrical characteristic that changes with a process variable. A first sealed portion is configured to be exposed to a process fluid. The process variable sensor is mounted relative to the first sealed portion. A second sealed portion couples the first sealed portion to the housing. The second sealed portion has at least one seal that fluidically isolates the first sealed portion from the housing.

DETAILED DESCRIPTION

It is becoming increasingly important to provide additional seal options in order to increase safety for process plants. As set forth above, if a primary seal fails, it can potentially create an unsafe condition where maintenance technicians could unknowingly be exposed directly to the pressurized process fluid. In accordance with embodiments described herein, additional secondary seals/pressure barriers are provided in order to contain the process fluid pressure as well as to potentially alert the user or maintenance technician to the breach of the primary seal. While embodiments described herein will focus generally on a particular type of process variable measurement assemblies (process fluid temperature measurement assembly) it is expressly contemplated that embodiments of the present invention can be practiced with any suitable type of process variable sensor sensing any suitable process variable. Accordingly, those skilled in the art should appreciate that embodiments of the present invention can be practiced with process fluid pressure measurement, process fluid flow measurement, process fluid level measurement, and others.

Figure 1:
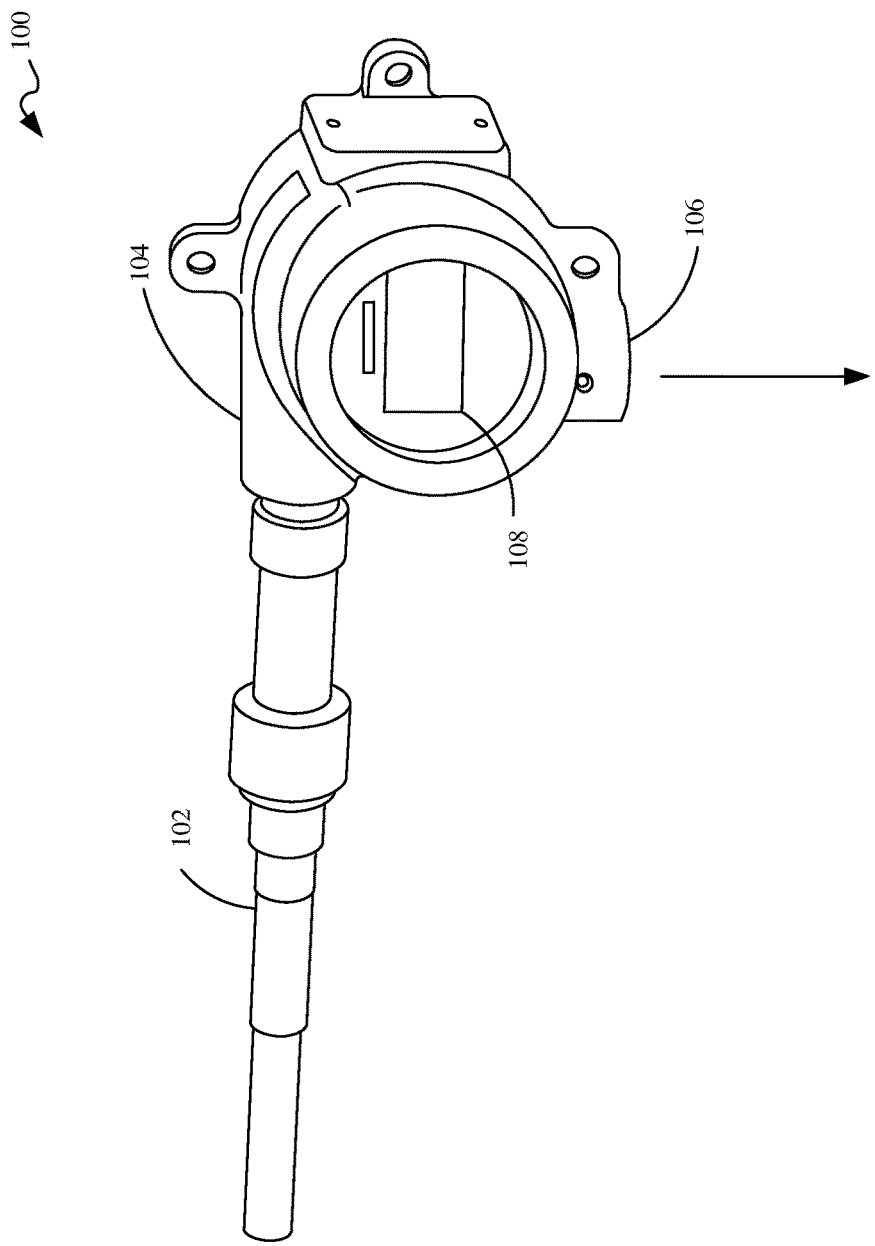
FIG. 1 is a diagrammatic view of a process temperature measurement point (100); thermowell (102), temperature sensor (inside thermowell 102), transmitter housing (104), and temperature transmitter electronics (108) with which embodiments of the present invention are particularly applicable.

FIG. 1 is a diagrammatic view of a process fluid temperature measurement point with which embodiments of the present invention are particularly applicable. Process fluid temperature measurement assembly 100 generally includes thermowell 102 coupled to housing 104 that may contain suitable electronic transmitter in order to convey the process fluid temperature information to another device or control room via conduit coupling 106. Additionally, housing 104 may also include a local display, such as display 108 to provide information indicative of the process fluid temperature. Thermowell 102 generally contains at least one temperature sensor, such as a resistance temperature device (RTD) that has an electrical parameter (resistance) that changes with temperature. The resistance is measured by circuitry within housing 104 and operated upon by electronics, such as a microprocessor, to provide a process variable output that can be conveyed via local display 108 or to other devices via conduit coupling 106.

Thermowell 102 is generally configured for direct contact with the process fluid. As such, thermowell 102 may experience erosion or fatigue due to contact with the process fluid. In the event that the erosion or fatigue breaches thermowell 102, process fluid will enter thermowell 102 pass through the sensor 110/124 pressurizing housing 104 and potentially even pressurizing the conduit coupled to conduit coupling 106. The pressurized fluid can even pressurize the entire conduit system back to marshalling panels and possibly back to the control room. This is highly undesirable.

Figure 2:
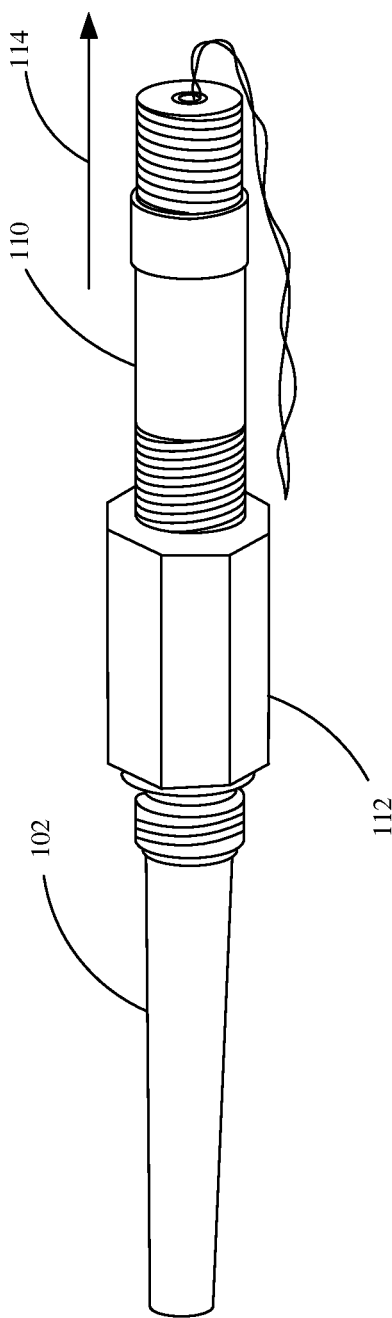
FIG. 2 is a diagrammatic view showing the result of removal of a temperature sensor module (110) from a thermowell (102) when the thermowell has been breached or otherwise allows process fluid pressure (114) therein.

FIG. 2 is a diagrammatic view showing the result of a technician removing temperature sensor module 110 from thermowell 102 when thermowell 102 has been breached or otherwise allows process fluid pressure therein. As set forth above, this can be caused by corrosion of thermowell 102 or by cracking (potentially due to fatigue) or other mechanical challenges to thermowell 102. Regardless, when thermowell 102 is breached, process fluid can flow into the thermowell and pressurize the temperature sensor module 110, assuming that the MI cable of temperature sensor module 110 is able to maintain the pressure. If the mineral insulated cable is not able to contain the pressure, the pressure will flow into the housing, such as housing 104 (shown in FIG. 1), which is not desirable. If the MI cable holds the process pressure, the process pressure will act against temperature sensor module 110 until a maintenance technician begins decoupling temperature sensor module 110 from thermowell 102. As the threads are decoupled, flammable, toxic or very hot process fluid can escape and a violent decoupling can occur where temperature sensor module 110 may be launched with significant force in the direction of arrow 114 and process fluid pressure may openly flow from thermowell 102. This can create safety risks to the maintenance technician or other personnel in the plant and environmental damage. Accordingly, it is important that breaches of the primary pressure seal/barrier be dealt with safely and effectively.

Figure 3A:
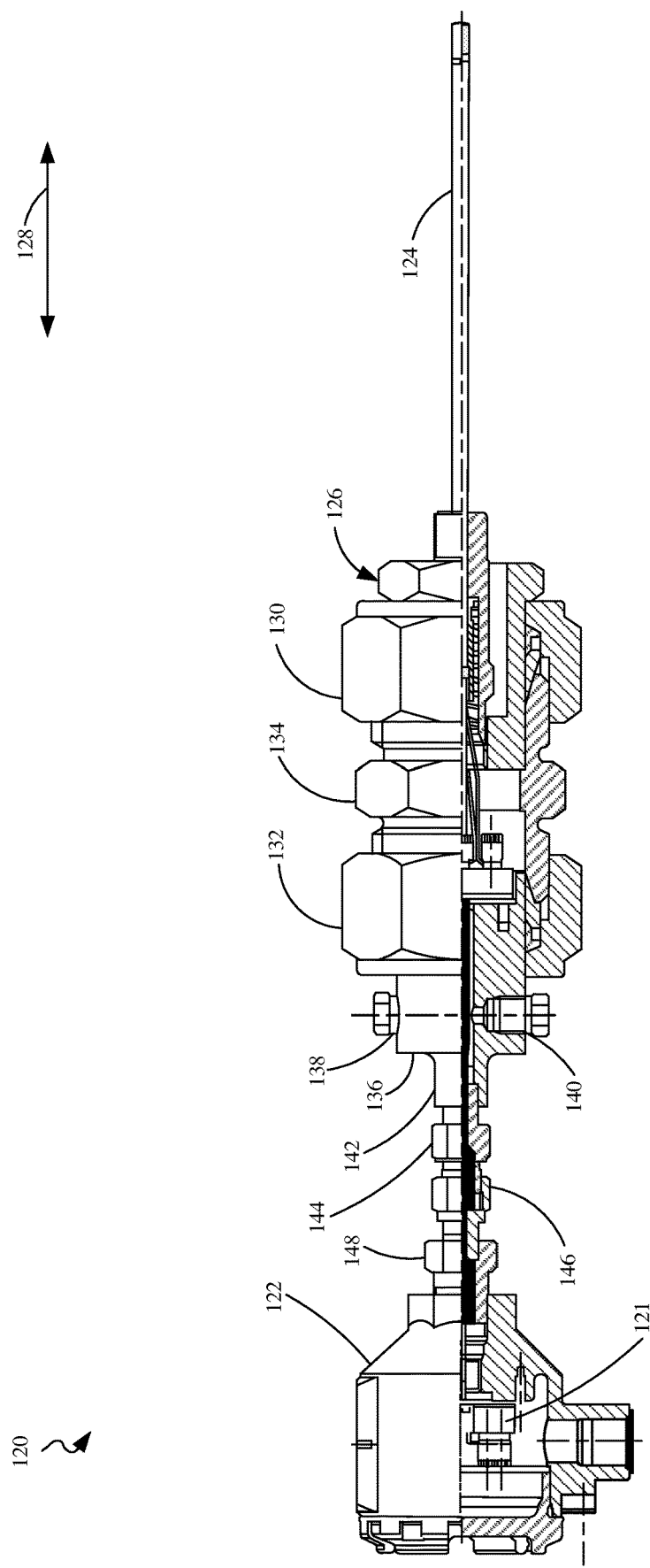
FIG. 3A is a diagrammatic views of a process fluid temperature sensing system employing at least one secondary seal in accordance with an embodiment of the present invention.

FIG. 3A is a diagrammatic views of a process fluid temperature sensing system employing at least one secondary seal in accordance with an embodiment of the present invention. Temperature sensor assembly 120 includes housing 122 that may house a terminal block 121, a head mounted temperature electronics module, or any other suitable electronics assembly. In the embodiment shown in FIG. 3A, housing 122 has a terminal block 121 mounted therein that allows electrical interconnection to be made to the temperature sensor(s) provided in probe 124. Probe 124 may contain any suitable number of temperature sensors. Moreover, the types of temperature sensors can be varied and includes, without limitation, thermocouples, RTDs, thermistors, or other suitable devices. Probe 124 generally mounts within a thermowell (not shown in FIG. 3A) that couples directly to the process fluid. Temperature sensor probe 124 is mounted to body 126 and, in one embodiment, is spring-loaded such that temperature sensor probe 124 is displaceable in the direction of arrow 128. This displacement of probe 124 helps ensure that temperature sensor probe 124 comes to rest directly against the internal end of the thermowell thereby ensuring effective thermal contact with the thermowell. Body 126 is generally formed of a pair of compression fittings 130, 132 that are coupled together via union 134. Fittings 130, 132, and union 134 are generally designed to withstand the maximum process fluid pressure. This is because in the event that the thermowell seal fails, the process fluid pressure will travel within fittings 130, 132, and 134. In one embodiment, fittings 130, and 132 are compression fittings that are formed out of stainless steel and are designed to withstand up to 270 bar. Within compression fitting 132, a terminal block or other suitable electrical interconnect can be provided to facilitate interconnection with the leads of the temperature sensors within probe 124. After installation, the compression fitting 132 can be loosened and retightened as necessary to allow the sensor leadwires to be disconnected from the internal terminal block for replacement during normal maintenance.

In at least some situations, it is desirable for the process variable measurement assembly to sense and/or potentially indicate when a breach of the primary seal/pressure barrier has occurred. In accordance with one embodiment, compression fitting 132 is coupled to manifold 136 having one or more ports 138, 140. In the embodiment shown in FIG. 3A, each of ports 138, 140 is plugged. However, ports 138, 140 allow other devices to be coupled to the internal volume of process fluid temperature sensor assembly 120 such that conditions can be sensed and/or remedial actions can be taken when the primary seal fails. Examples of such devices, which will be described in greater detail below, include valves, pressure switches, process fluid pressure measurement systems, or any other device that is able to sense or otherwise indicate a pressure or controllably allow the pressure to be safely vented or otherwise removed when the process fluid temperature measurement assembly is pressurized.

In this embodiment, manifold 136 has an internally-threaded portion 142 into which coupler 144 is threaded. Coupler 144 is also coupled to secondary crushed ceramic powder seal 146. In one embodiment, seal 146 is a ¼ inch NPT fitting that uses a crushed ceramic powder sealing method. Wires passing through crushed ceramic powder seal 146 are generally bare with the conductors themselves interfacing directly with the crushed ceramic powder. In one embodiment, each conductor is formed of solid nickel and has a diameter of approximately 0.5 mm. The crushed ceramic powder seal 146 is then coupled to a ½ inch NPT fitting 148 which is attached to housing 122. The ½ inch NPT fitting 148 is also, in one embodiment, filled the Stycast potting (available from Henkel Corporation, of Rocky Hill, Conn.) which is designed primarily for strain relief on the wires.

Figure 3B:
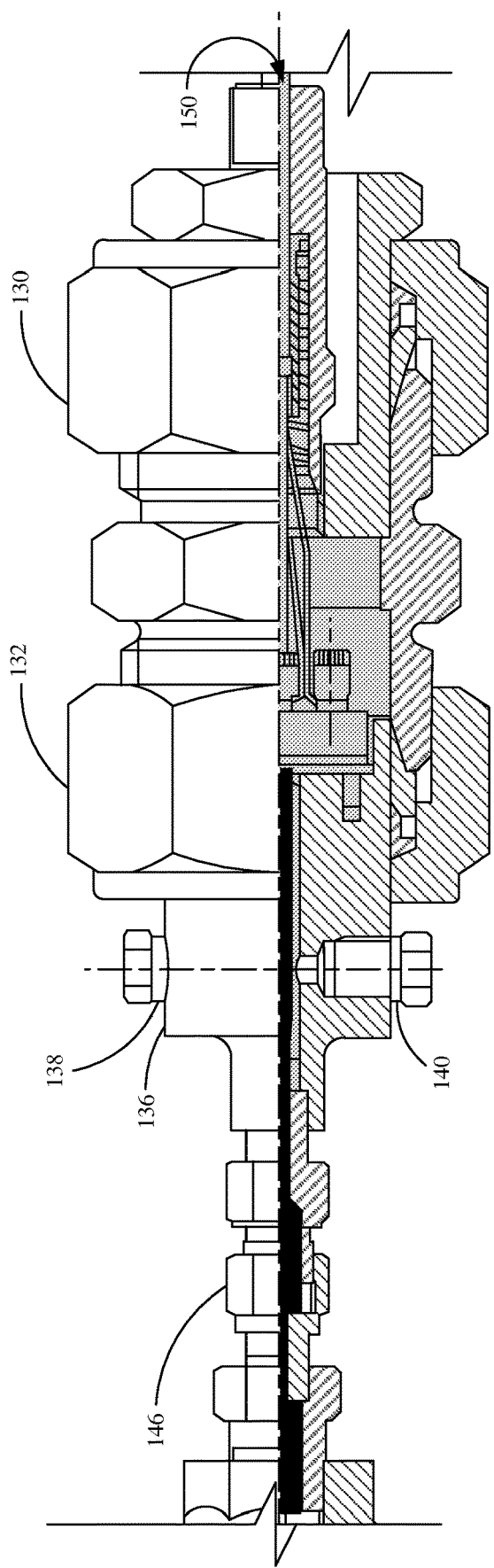
FIG. 3B is an enlarged view of a portion of the device shown in FIG. 3A when both the thermowell and the mineral-insulated (MI) cable have been breached.

FIG. 3B is an enlarged view of a portion of the device shown in FIG. 3A when both the thermowell and the MI cable have been breached. When this occurs, process fluid enters the assembly through aperture 150. The process fluid, which may be pressurized, travels through compression fittings 130 and 132. Accordingly, as shown in FIG. 3B, process fluid pressure travels through fitting 132 and into manifold 136. As described above, suitable pressure detection, indication and/or relief accessories may be attached to ports 138, 140. As can be seen in FIG. 3B, in the event that pressurized fluid is present within manifold 136, it will flow into ports 138, 140 and to the various accessories which may be attached thereto. The process fluid flows all the way to ceramic powder seal fitting 146 where it is contained. Ceramic powder seal fitting 146 is designed, in some embodiments, to provide a seal of up to 680 bars. In one example, fitting 146 is formed of 303 stainless steel, however other suitable materials can be used. As shown in FIG. 3B, while the breached process fluid pressure has been safely contained, it still may be a hazard to technicians who may be tasked with repairing or replacing the device. Thus, pressure detection, indication, and/or relief accessories are particularly important in allowing technicians to safely interact with process variable measurement assembly 120.

In some situations, it may be beneficial or even required to generate an annunciation of the primary process seal breach by electronic sensing or other suitable techniques. As set forth above, some embodiments of the present invention include the provision of manifold 136 that allows various devices to be coupled to the system in order to provide pressure annunciation and/or remediation. Moreover, the manner of annunciation and the type of remediation may vary based upon the end user requirements. Accordingly, the provision of manifold 136 and multiple ports is of particular importance. Some users may believe that pressure switches, for example, are unreliable because they cannot generally be tested nondestructively. In other situations, the end user may require a local visual indication at the instrument because an electronic annunciation may not be able to be communicated (i.e. the particular process installation may not use a type of electronic communication that is available from the device) or a particular work order may be waiting for the next scheduled shut down. When this occurs, the maintenance technician in the field may not have the information on the work order. In still other instances, users may require a vent to depressurize the device for safe servicing by the technician and so it may be useful to provide a pressure relief valve. In order to provide for this varied modularity, manifold 136 provides access ports 138, 140 where piping and/or additional instrumentation such as a dial pressure indicator, pressure measurement system, pressure switch, pressure relief valve, or other suitable device can be coupled to the system depending on the end user requirements. Additionally, the various pressure detection/annunciation/remediation accessories can be provided to the end user based on their requirements.

Figure 3C:
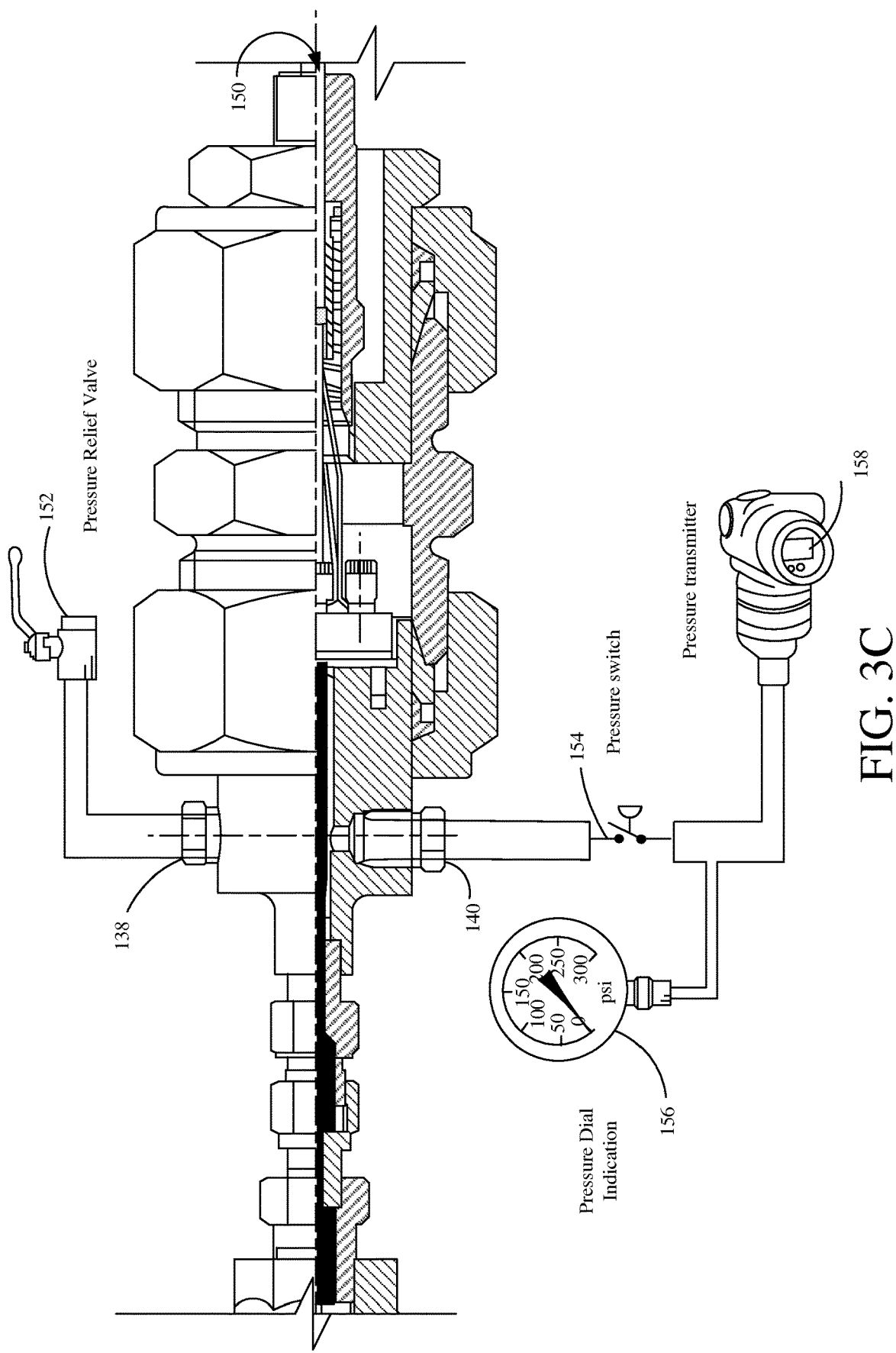
FIG. 3C is a diagrammatic view of some different types of pressures detection, indication, and/or relief accessories coupled to accessory ports in accordance with one embodiment of the present invention.

FIG. 3C is a diagrammatic view of some different types of pressures detection, indication, and/or relief accessories that may be coupled to accessory ports 138, and 140, in accordance with embodiments of the present invention. FIG. 3C shows pressure relief valve 152 coupled to accessory port 138 such that a technician may operate valve 152 in order to manually release process fluid pressure. Additionally, a number of devices are shown coupled to accessory port 140. In particular, pressure switch 154 is coupled to accessory port 140 as well as pressure dial indicator 156, and pressure measurement system 158. In the configuration shown in FIG. 3C, pressure dial indicator 156 and pressure measurement system 158 are shown in series with pressure switch 154. However, it is expressly contemplated that any suitable number of pressure sensing devices can be coupled to accessory port 140 in series, or in parallel, or in a combination of both, as desired. Pressure switch 154 will generally provide a signal when the pressure reaches a specified threshold. This signal is generally in the form of contacts either opening or closing (depending on the type of pressure switch), which condition is then detectable by relatively simple electrical circuit. In one embodiment, this is detectable by circuitry within housing 122, such that the temperature measurement system can not only communicate process fluid temperature (the process variable) but also provide an indication of primary seal breach locally, over a process communication loop, or both.

Dial pressure indicator 156 will shows the pressure to which it is exposed. Accordingly, in normal conditions when the primary pressure seal has not been breached, pressure dial indicator 156 will show zero pressure. When a breach occurs, a non-zero indication on pressure dial indicator 156 will be indicative of a pressurized process device. Similarly, pressure measurement system 158 is configured, in accordance with known techniques, to measure a process fluid pressure and provide an electrical indication thereof. This electrical indication can be provided over a process control loop, perhaps even the same process control loop to which the process fluid temperature measurement system is coupled. Additionally, pressure measurement system 158 may be configured to communicate wirelessly, such as in accordance with IEC 62591. Regardless, pressure measurement system 158 can sense a pressure within the process fluid pressure measurement system and convey information relative to the sensed pressure to the control room or other suitable devices.

Figure 3D:
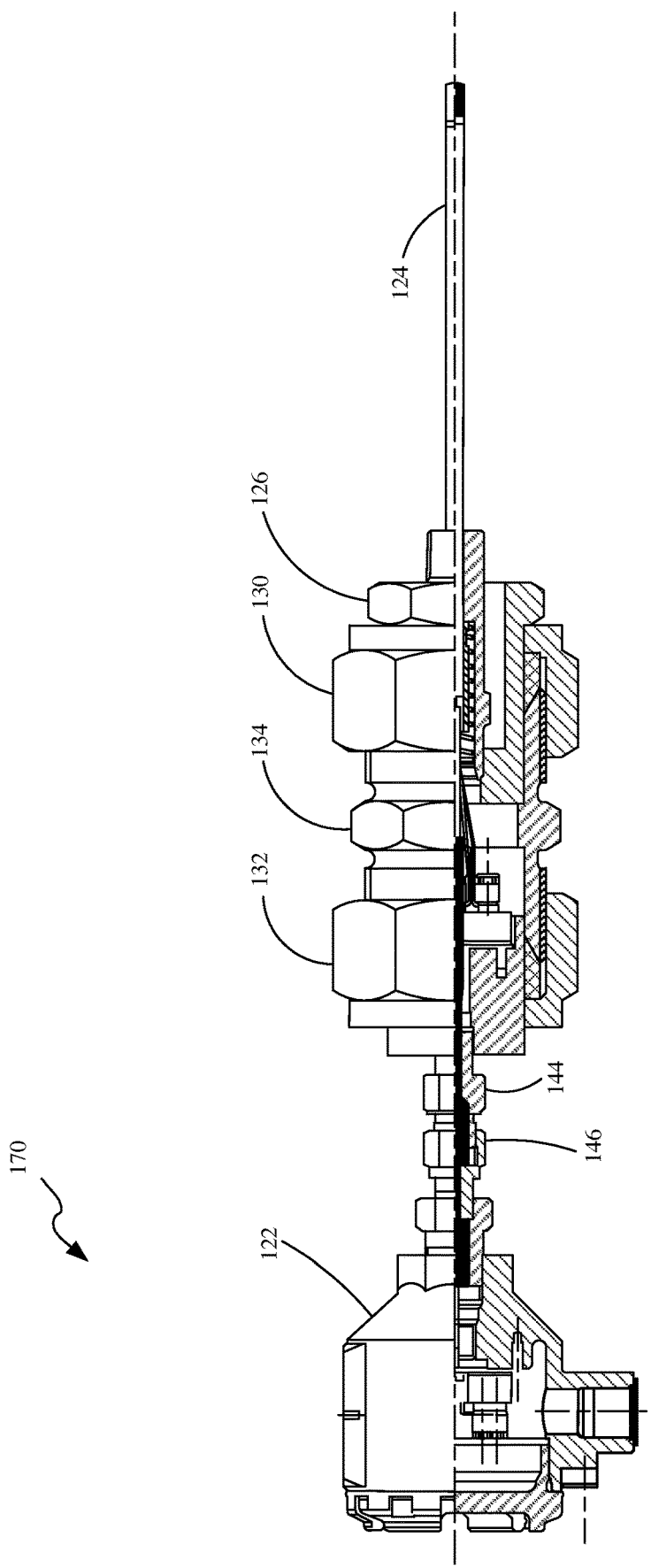
FIG. 3D is a diagrammatic view of a process fluid measurement system in accordance with another embodiment of the present invention.

FIG. 3D is a diagrammatic view of a process fluid measurement system in accordance with another embodiment of the present invention. System 170 bears many similarities to system 120 (shown in FIG. 3A) and like components are numbered similarly. As shown in FIG. 3D, system 170 includes a temperature sensing probe 124 that is operably coupled to a terminal block in housing 122 via a number of fittings. In particular, system 170 also includes ceramic powder-filled seal 146 that employs a compressed powdered ceramic around bare wires as they pass through seal 146. In the embodiment shown in FIG. 3D, these wires are nickel wires each having a diameter of approximately 0.5 mm. A difference between the embodiment shown in FIG. 3D and that of FIG. 3A is that system 170 does not include fitting/manifold 136 with pressure attachment ports. Accordingly, FIG. 3D illustrates that embodiments of the present invention can be practiced without manifold 136.

Figure 4A:
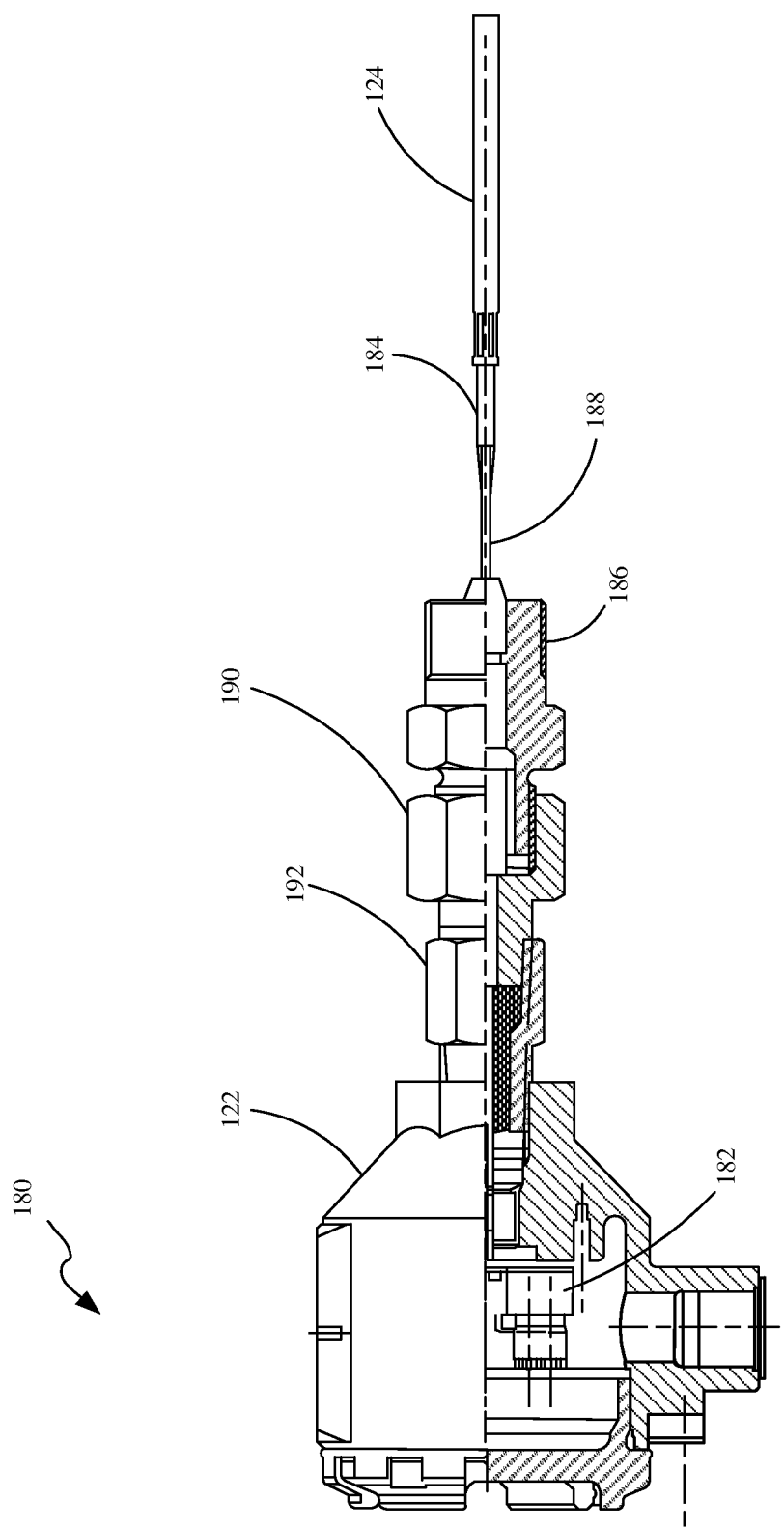
FIG. 4A is a diagrammatic view of a process variable measurement system with dual seals in accordance with another embodiment of the present invention.

FIG. 4A is a diagrammatic view of a process variable measurement assembly with dual seals in accordance with another embodiment of the present invention. System 180 includes head enclosure 122 that, in the embodiment shown in FIG. 4A, includes a terminal block with suitable connectors for facilitating electrical interconnections with conductors of the process variable sensor. Terminal block 182, in some embodiments, may be replaced with head-mounted electronics, such as a head mounted temperature transmitter module that couples to conductors of the process variable sensor and computes or otherwise determines the process variable and conveys the process variable over a process communication loop or segment in accordance with known techniques.

Like the temperature measurement systems described above, system 180 includes at least one temperature sensor probe 124 that can be comprised of one or more individual temperature sensors, such as RTDs, thermocouples, thermistors, etc. disposed within a metallic tube, such as a stainless steel tube. The conductors of sensor probe 124, in the embodiment shown in FIG. 4A, are coupled to a glass fiber cable 184. The glass fiber cable provides an operating temperature range, in some embodiments, up to 600 degrees Celsius. As shown in FIG. 4A, a transition between glass fiber cable 184 and fitting 186 is provided via a brazed portion 188. Brazed portion 188 may be insulated with a suitable shrinking hose, such as a polytetrafluoroethylene hose. Fitting 186 is coupled to secondary fitting 190 which may include a powdered ceramic bare wire pressure seal, such as that described with respect to seals 146. On the other end, fitting 186 is coupled to the thermowell shown in FIG. 4B. The tapers are forced together to form a pressure seal. Unlike previous embodiments, the conductors passing through seal 190 generally employ copper wires with a diameter with approximately 0.5 mm and may, in some embodiments, be insulated by polyimide such as Kapton available from E. I. du Pont de Nemours and Company, of Wilmington, Del. As shown in FIG. 4A, fitting 192 may be filled with a suitable fill material, such as Stycast. Further, the electrical interconnection between the conductors passing through fitting 192 and those coupling to the flying leads which terminate in terminal block 182 may be via brazing, or other suitable techniques. A further variation of system 180 may incorporate manifold 136, used in system 120 (shown in FIG. 3A)

Figure 4B:
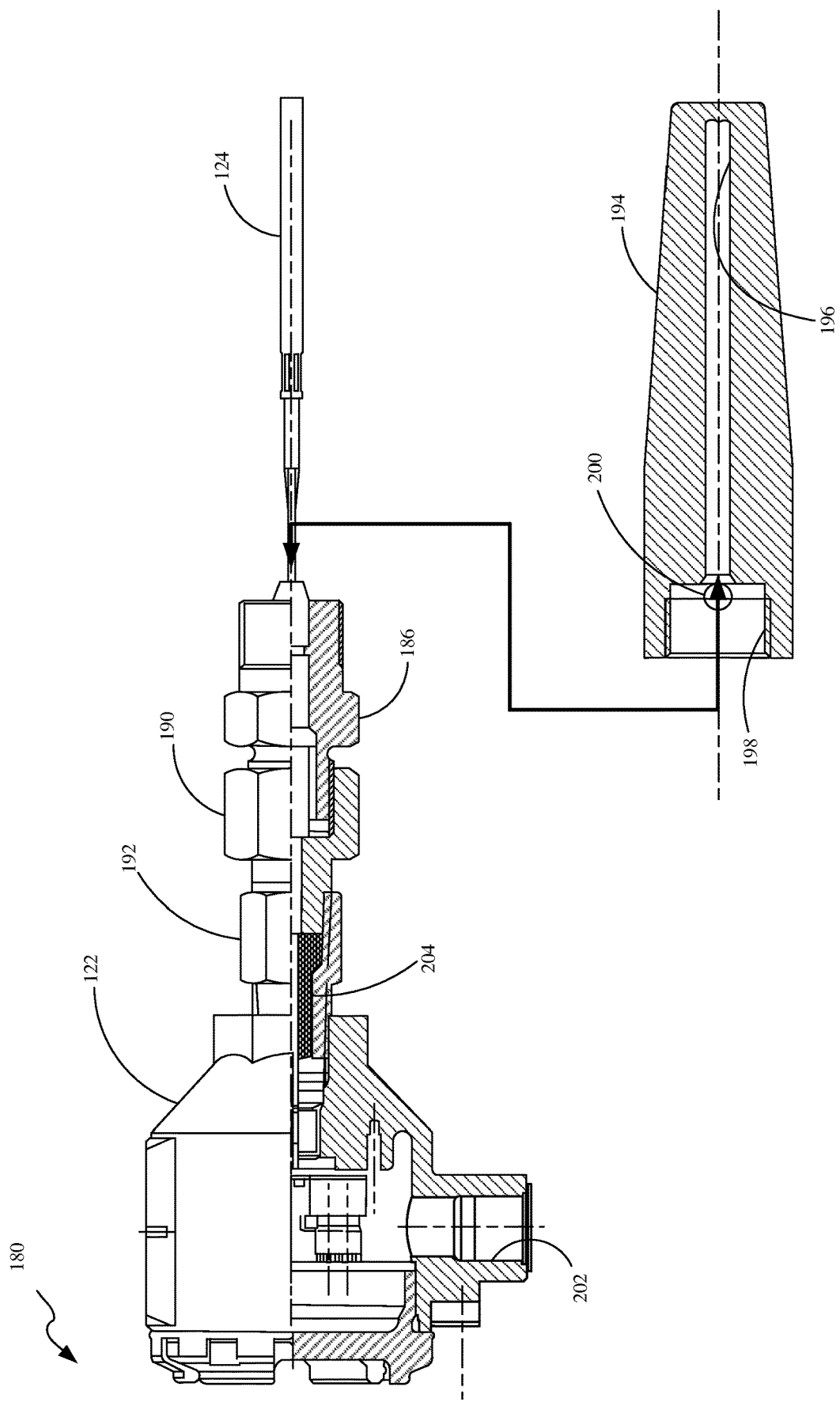
FIG. 4B is a diagrammatic view illustrating the process variable temperature measurement system shown in FIG. 4A operably coupleable to a thermowell (194) in accordance with an embodiment of the present invention.

FIG. 4B is a diagrammatic view illustrating the process variable temperature measurement system shown in FIG. 4A coupleable to a thermowell in accordance with an embodiment of the present invention. Sensor probe 124 is configured to be disposed within bore 196 of thermowell 194 and external 1⅛-12 UNF threads of connector 186 are configured to engage corresponding internal threads 198 of thermowell 194. Thermowell 194 also shows an additional feature in accordance with an embodiment of the present invention. In particular, thermowell 194 includes weep hole 200 that will leak or otherwise vent process fluid if the primary seal of thermowell 194 is breached. In this way, pressure will be vented before it can pressurize housing 122 and/or additional structures coupled to conduit coupling port 202. Thus the embodiment shown in FIG. 4B provides a visual indication of a primary seal breach (via process fluid exiting weep hole 200).

FIG. 4B shows a shaded region that becomes pressurized when the seal of thermowell 194 is breached and weep hole 200 is plugged and/or cannot otherwise vent the fluid pressure quickly enough. The shaded region indicates that the process fluid will flow through fitting 186, through fitting 190, and finally be contained at fitting 192 which generally has copper wires with polyimide foil insulation surrounded by Stycast potting 204.

Figure 5:
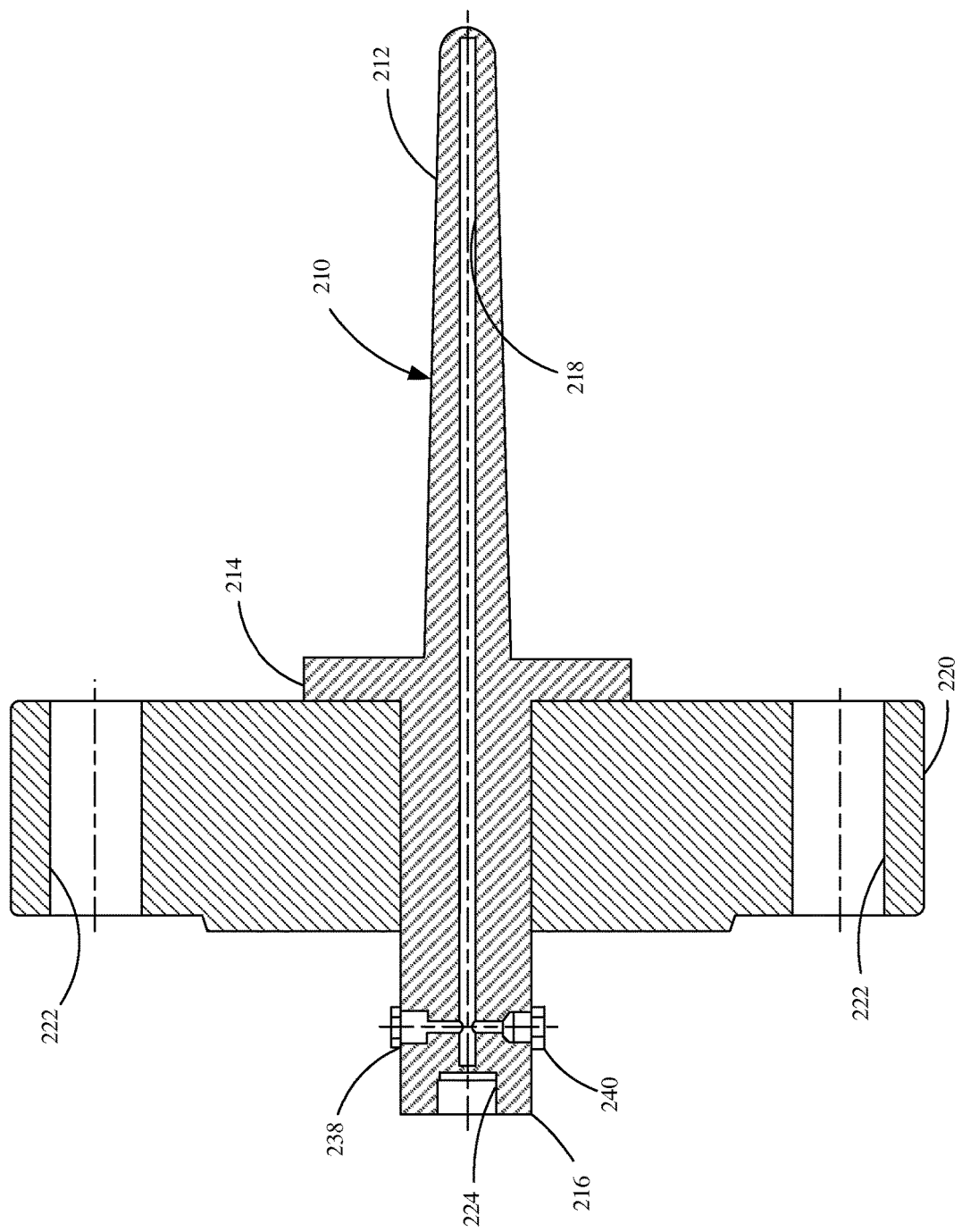
FIG. 5 is a diagrammatic cross-sectional view of a "Van Stone" style thermowell in accordance with an embodiment of the present invention.

FIG. 5 is a diagrammatic cross-sectional view of a "Van Stone" style thermowell in accordance with an embodiment of the present invention. Thermowell 210 includes a process fluid engaging portion 212, mounting portion 214, and process instrument connection portion 216. In the embodiment shown in FIG. 5, process engaging portion 212 has a slight taper. Additionally, thermowell 210 includes a probe aperture 218 that is sized to receive a temperature probe, such as sensor probe 124. The probe within aperture 218 is shielded from the process fluid but generally will have virtually the same temperature of the process fluid by due to flow through the metallic walls of portion 212. Generally, portion 212 has a cylindrical shape, however other suitable shapes can be used. Mounting portion 214 may be welded to ASME, API or DIN flange 220, compressed between two flanges, or otherwise secured thereto. In one embodiment, the compression of a gasket between mounting portion 214 and a mating flange 220 generates a seal that is suitable for process fluid pressures up to and including 15,000 psi. ASME, API or DIN flanges 220 includes one or more mounting holes 222 for mounting to the process. Instrument engaging portion 216 generally has an internally threaded aperture 224 that is configured to receive a fitting of process instrumentation, such as fitting 186 (shown in FIG. 4B). Additionally, in accordance with one embodiment, instrument engaging portion 216 includes a plurality of auxiliary pressure ports 238, and 240. These pressure ports allow the coupling of any suitable pressure indication and/or remediation devices, such as pressure switch 154, pressure dial indicator 156, and/or pressure measurement system 158 (shown in FIG. 3C). Accordingly, employing thermowell 212 in conjunction with instrument 180 (shown in FIG. 4B) still provides the same abilities to indicate and/or release pressure (as the embodiment shown in FIGS. 3A-3C).

Further still, the inclusion of ports 238 and 240 on instrument coupling portion 216 may allow for a more compact design.

Figure 6:
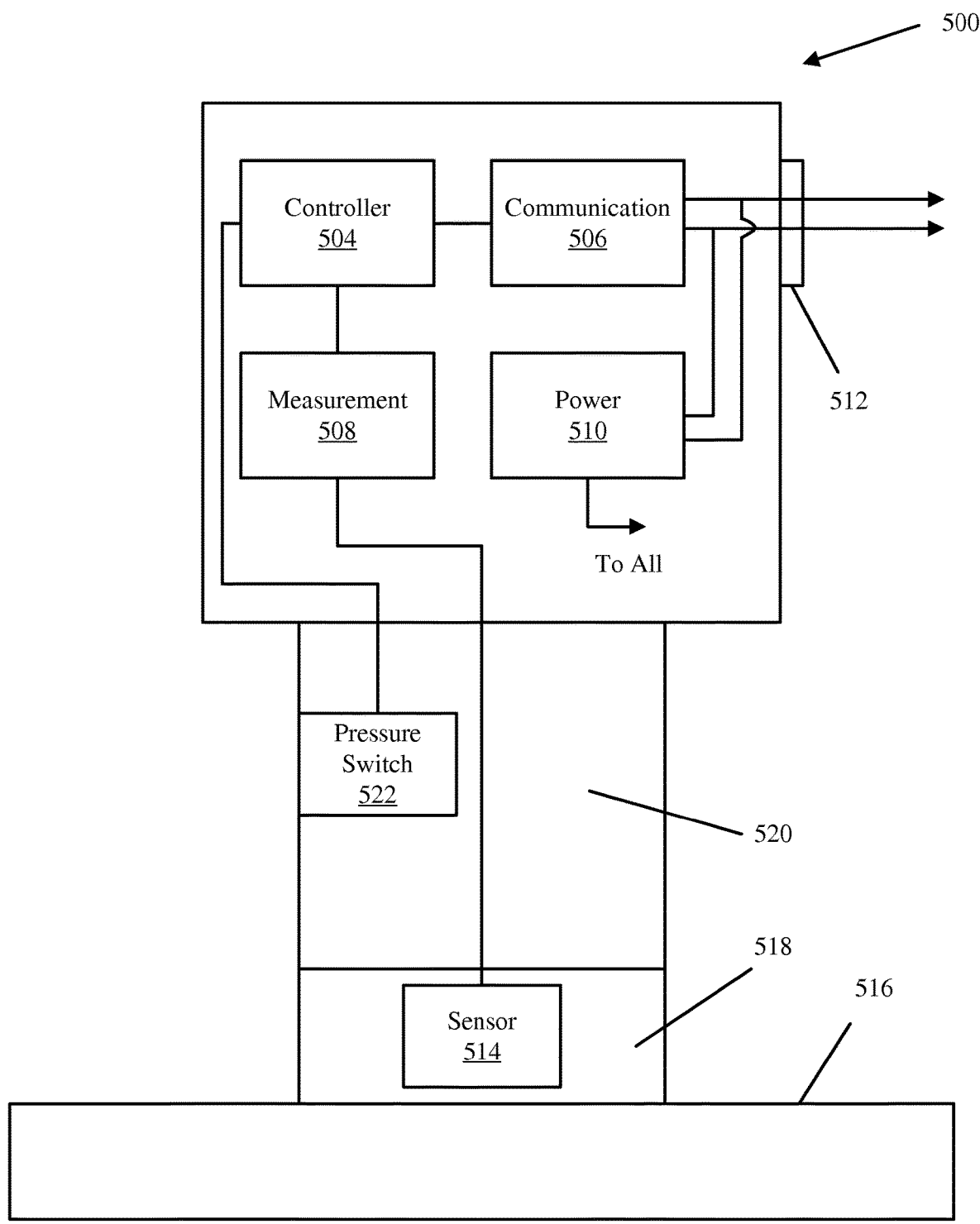
FIG. 6 is a diagrammatic view of a process temperature measurement assembly in accordance with an embodiment of the present invention.

It is expressly contemplated that at least some embodiments of the present invention can be practiced as a retrofit to existing process installations. FIG. 6 is a diagrammatic view of a process variable measurement assembly in accordance with an embodiment of the present invention. Process variable measurement assembly 500 includes housing 502 containing controller 504, communication circuitry 506, measurement circuitry 508, and power module 510. Communication circuitry 506, in one embodiment, may couple to a wired process control loop or segment via conduit coupling port 512.

Controller 504 may be any suitable electronic device or configuration that is able to generate process variable information based on a signal from measurement circuitry 508, to which it is coupled. Accordingly, controller 504 may be a microprocessor, microcontroller, programmable gate array, et cetera. In one embodiment, controller 504 received digital information from measurement circuitry 508 that is indicative of a measurement relative to process variable sensor 514. This digital information may be processed by controller 504 to generate process variable information (such as a process fluid temperature) and then conveyed to communication circuitry 506 for transmission to a remote device.

Communication circuitry 506 allows process variable measurement assembly 500 to communicate in accordance with a process industry standard protocol. Such communication may be via wired media (conductors physically coupled to communication circuitry 506 via conduit coupling port 512, wireless (such as using radio-frequency communication) or both. Examples of suitable wired process communication protocols include, without limitation, the Highway Addressable Remote Transducer (HART®) protocol, the FOUNDATION™ Fieldbus protocol, Profibus DP, and others. Examples of wireless process communication protocols include IEC 62591.

Power module 510, in one embodiment, couples to the wires of the process control loop or segment and provides suitably conditioned power to components of process variable measurement assembly 500, as indicated by the arrow labelled "To All." In such embodiment, process variable measurement assembly 500 may be wholly powered via the process control loop or segment. In embodiments, where process variable measurement assembly 500 communicates wirelessly, power module 510 may include a suitable battery and conditioning circuitry to provide power to the other components of process variable transmitter 500.

Measurement circuitry 508 includes any suitable circuitry that is able to perform a measurement of an electrical property of process variable sensor 514. Measurement circuitry 508 may include an analog-to-digital converter, amplification circuitry, switching circuitry, or any other circuitry or logic useful in obtaining a measurement from process variable sensor 514. For example, if process variable sensor has a resistance that varies with a process temperature, for example, measurement circuitry 508 may include circuitry for passing a known amount of current through the sensor and measuring a voltage across the sensor, which is indicative of the resistance of the sensor.

Process variable sensor 514 may be any suitable type of sensor for measuring the process variable of interest. Process variable sensor 514 is operably coupled to process 516, but is separated therefrom within primary sealed volume 518. An example of primary sealed volume 518 is a thermowell. A secondary sealed volume 520 couples primary sealed volume 518 to housing 502. In the event that process fluid breaches primary sealed volume 518, the process fluid will enter secondary sealed volume 520. In the embodiment shown in FIG. 6, a pressure switch 522 is fluidically coupled to secondary sealed volume 520 and is electrically coupled to controller 504. In the event that process fluid within secondary sealed volume reaches a level to trip or otherwise actuate pressure switch 522, controller 504 will detect the change of state and execute logic or program steps to indicate a breach of primary sealed volume 518. For example, controller 504 may cause a local operator interface (not shown in FIG. 6) to provide an output indicative of the breach. Additionally, or alternatively, controller 504 may generate suitable communication using communication circuitry 506 to alert one or more remote devices or parties of the breach.

Although the present invention has been described with reference to preferred embodiments, workers skilled in the art will recognize that changes may be made in form and detail without departing from the spirit and scope of the invention.

What is claimed is:

1. An apparatus for sensing a process variable, the apparatus comprising:
    a housing comprising electronics configured to generate a signal indicative of the process variable;
    a process variable sensor having an electrical characteristic that changes with a process variable, the process variable sensor being coupled to the electronics;
    a first sealed portion configured to be exposed to a process fluid, and wherein the process variable sensor is mounted relative to the first sealed portion;
    a second sealed portion coupling the first scaled portion to the housing, the second sealed portion having at least one powdered ceramic seal that fluidically isolates the first sealed portion from the housing, the second sealed portion including a pressure port coupled to an interior of the second sealed portion, wherein the pressure port is configured to receive a sensor that provides an indication of a primary seal breach; and
    a pressure response system having a manifold coupled to the second sealed portion to receive process fluid after a breach of the first sealed portion and generate a response.

2. The apparatus of claim 1, and further comprising a terminal block disposed within the housing, the terminal block having a plurality of terminals coupled to the process variable sensor.

3. The apparatus of claim 2, wherein the process variable sensor is coupled to the terminal block, at least in part, by a glass fiber cable.

4. The apparatus of claim 1, wherein the first sealed portion comprises a thermowell.

5. The apparatus of claim 1, and further comprising a pressure switch coupled to the pressure port.

6. The apparatus of claim 1, and further comprising a valve coupled to the pressure port.

7. The apparatus of claim 1, and further comprising a pressure indicating device coupled to the pressure port.

8. The apparatus of claim 1, wherein the second sealed portion has electrical conductors passing therethrough.

9. The apparatus of claim 8, wherein the electrical conductors are bare.

10. The apparatus of claim 9, wherein the electrical conductors are formed of nickel.

11. The apparatus of claim 9, wherein the electrical conductors are formed of copper.

12. The apparatus of claim 1, and further comprising process variable measurement electronics disposed within the housing and coupled to the process variable sensor, the process variable measurement electronics being configured to measure the electrical characteristic of the process variable sensor, determined a process variable output based on the measured electrical characteristic and communicate the process variable output.

13. The apparatus of claim 12, wherein the process variable electronics are coupled to a pressure switch that is coupled to the second sealed volume, and wherein the process variable measurement electronics are configured to provide the process variable output as well as an indication of a breach of the first sealed portion.

14. The apparatus of claim 1, wherein the response comprises at least one of the following:
    an alarm;
    an indication signal to a user interface; and
    opening a pressure release valve.

15. A thermowell comprising:
    a process engaging portion having a bore therein for receiving a temperature sensor probe;
    a mounting portion configured to mount to a flange;
    a process instrument engaging portion configured to couple to a process fluid temperature instrument, the process instrument engaging portion having at least one auxiliary pressure port fluidically coupled to an interior of the process instrument engaging portion;
    a transmitter housing coupling feature, wherein the coupling feature includes, when coupled to a transmitter housing, a secondary seal configured to seal process fluid from the transmitter housing after a breach of the process engaging portion;
    a pressure sensing system having a manifold coupled to the process instrument engaging portion, the pressure sensing system configured to sense a breach of the process engaging portion via the manifold and generate a signal indicative of the breach; and
    a controller electrically coupled to the pressure sensing system, the controller configured to receive the signal indicative of the breach and generate a notification signal indicative of the breach and output the notification signal to a user interface.

16. The thermowell of claim 15, and further comprising an API flange welded to the mounting portion.

17. The thermowell of claim 15, wherein the auxiliary pressure port is configured to receive a pressure sensor configured to provide an indication of the breach of the process engaging portion.

* * * * *